United States Patent
Liu et al.

(10) Patent No.: US 10,952,097 B2
(45) Date of Patent: *Mar. 16, 2021

(54) FRAME TRANSMISSION METHOD FOR WIRELESS LOCAL AREA NETWORK AND WIRELESS LOCAL AREA NETWORK APPARATUS

(71) Applicant: HUAWEI TECHNOLOGIES CO., LTD., Guangdong (CN)

(72) Inventors: Le Liu, Shenzhen (CN); Yi Luo, Shenzhen (CN); Guido Montorsi, Turin (IT); Sergio Benedetto, Turin (IT)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,676

(22) Filed: Jul. 19, 2019

(65) Prior Publication Data
US 2020/0022024 A1 Jan. 16, 2020

Related U.S. Application Data

(63) Continuation of application No. 15/472,887, filed on Mar. 29, 2017, now Pat. No. 10,390,260, which is a
(Continued)

(51) Int. Cl.
*H04W 28/06* (2009.01)
*H04L 27/26* (2006.01)
*H04W 84/12* (2009.01)

(52) U.S. Cl.
CPC ....... *H04W 28/065* (2013.01); *H04L 27/2607* (2013.01); *H04L 27/2613* (2013.01); *H04W 84/12* (2013.01)

(58) Field of Classification Search
CPC .... H04W 84/12; H04L 27/2602; H04L 69/22; H04L 27/2605; H04L 27/2607; H04L 27/2613
See application file for complete search history.

(56) References Cited

U.S. PATENT DOCUMENTS 7,444,134 B2 10/2008 Hansen et al.
2011/0051705 A1 3/2011 Jones, IV et al.
(Continued)

FOREIGN PATENT DOCUMENTS

CN 102474492 A 5/2012
CN 102714643 A 10/2012

OTHER PUBLICATIONS

PCT/CN2014/088067, International Search Report, dated Jul. 3, 2315.
(Continued)

*Primary Examiner* — Jung H Park
(74) *Attorney, Agent, or Firm* — Womble Bond Dickinson (US) LLP

(57) ABSTRACT

Embodiments of the present invention disclose a frame transmission method for a wireless local area network and a wireless local area network apparatus, and relate to the field of communications technologies. According to the present invention, in a frame transmission process in a WLAN, a frame sent by a wireless local area network WLAN apparatus is received, and the frame of a particular standard is recognized by detecting a user common signal field included in the frame, so that backward compatibility of a WLAN apparatus is implemented, and hybrid networking of WLAN apparatuses of different standards can be supported, thereby improving flexibility of network deployment, and reducing complexity of networking.

9 Claims, 10 Drawing Sheets

Generate a frame, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period — 101

Send the frame to a wireless local area network WLAN apparatus — 102

Related U.S. Application Data continuation of application No. PCT/CN2014/088067, filed on Sep. 30, 2014.

(56) References Cited

U.S. PATENT DOCUMENTS

| | | | |
|---|---|---|---|
| 2015/0009894 A1* | 1/2015 | Vermani | H04L 27/2602 370/328 |
| 2015/0078368 A1 | 3/2015 | Vermani et al. | |
| 2015/0117433 A1* | 4/2015 | Zhang | H04L 27/2613 370/338 |
| 2016/0119047 A1* | 4/2016 | Lee | H04L 5/0048 370/329 |
| 2016/0156750 A1* | 6/2016 | Zhang | H04L 27/26 370/338 |

OTHER PUBLICATIONS

IEEE Computer Society, "Part 11: Wireless LAN Medium Access Control (MAC) and Physical Layer (PHY) Specifications," IEEE Standards Association, Mar. 29, 2012.

IEEE Computer Society, "Part 11; Wireless LAN Medium Access Control (MAC) and Physical Layer (PHY) Specifications—Amendment 4; Enhancements for Very High Throughput for Operation in Bands below 6GHz," IEEE Standards Association, Mar. 29, 2012.

International Search Report dated Jul. 3, 2015 in corresponding International Application No. PCT/CN2014/088067.

International Search Report dated Jul. 3, 2015 in International Application No. PCT/CN2014/088067.

* cited by examiner

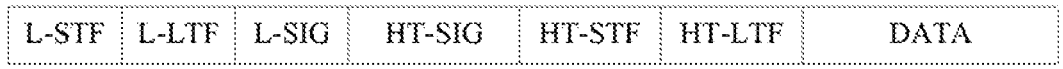
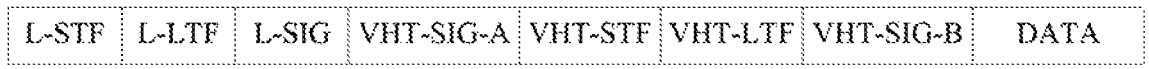
FIG. 1
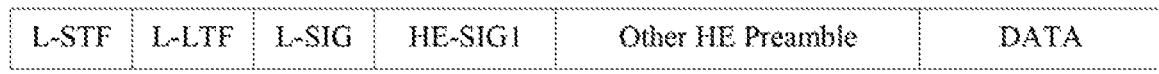
FIG. 2
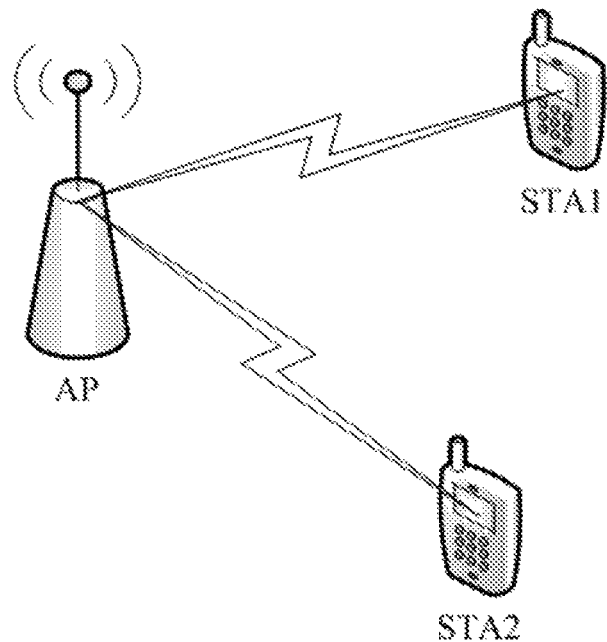
FIG. 3

Generate a frame, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period ⟵ 101

Send the frame to a wireless local area network WLAN apparatus ⟵ 102

FIG. 4

| 1.6 μs | 3.2 μs | 3.2 μs | 0.8 μs | 3.2 μs | 0.8 μs | 3.2 μs | 0.8 μs | 1.6 μs | 3.2 μs |
|---|---|---|---|---|---|---|---|---|---|
| 2 × GI | L-LTF | L-LTF | GI | L-SIG | GI | HE-SIG1(1st) | GI | 2 × GI | HE-SIG1(2nd) |

FIG. 5A

| 1.6 μs | 3.2 μs | 3.2 μs | 0.8 μs | 3.2 μs | 3.2 μs | 0.8 μs | 3.2 μs | 0.8 μs | 3.2 μs | 0.8 μs | 1.6 μs | 3.2 μs |
|---|---|---|---|---|---|---|---|---|---|---|---|---|
| 2 × GI | L-LTF | L-LTF | GI | L-SIG | L-SIG | GI | HE-SIG1(1st) | GI | HE-SIG1(1st) | GI | 2 × GI | HE-SIG1(2nd) |

FIG. 6

| 1.6 μs | 3.2 μs | 3.2 μs | 0.8 μs | 3.2 μs | 0.8 μs | 3.2 μs | 0.8 μs | 3.2 μs | 0.8 μs | 1.6 μs | 3.2 μs |
|---|---|---|---|---|---|---|---|---|---|---|---|
| 2 × GI | L-LTF | L-LTF | GI | L-SIG | GI | L-LTF | GI | HE-SIG(1st) | GI | 2 × GI | HE-SIG(2nd) |

FIG. 7

Receive a frame sent by a wireless local area network WLAN apparatus, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is the same as the length of the cyclic prefix of the legacy signal field, and a length of the second symbol cyclic prefix is two times the length of the cyclic prefix of the legacy signal field — 201

Remove, from a first received symbol, a prefix having a length two times the length of the cyclic prefix of the legacy signal field, and perform quarter-cycle cyclic shifting on a remaining part to obtain a first payload received symbol, where the first received symbol includes the first symbol cyclic prefix, the first symbol, and the first symbol cyclic suffix, and the cycle is a length of the first symbol — 202

Remove, from N second received symbols separately, a prefix having a length two times the length of the cyclic prefix of the legacy signal field, to obtain N second payload received symbols, where the second received symbol includes the second symbol and the corresponding second symbol cyclic prefix — 203

Demodulate the first payload received symbol and the N second payload received symbols to obtain data information — 204

FIG. 9

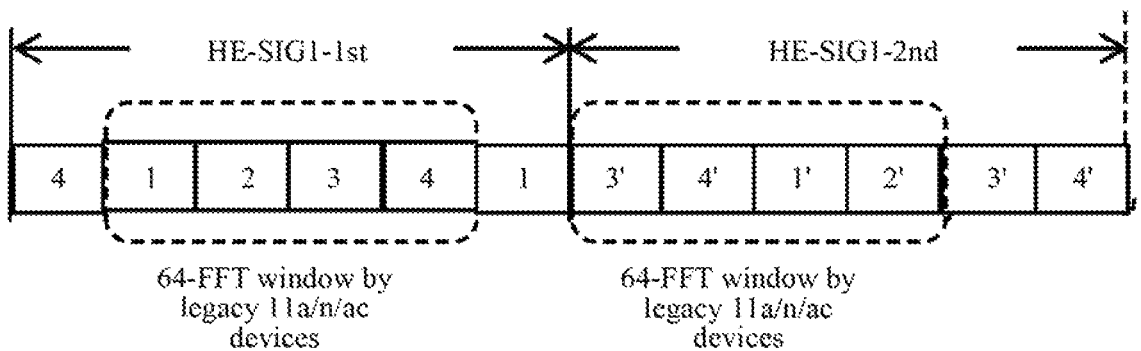

FIG. 10

FRAME TRANSMISSION METHOD FOR WIRELESS LOCAL AREA NETWORK AND WIRELESS LOCAL AREA NETWORK APPARATUS

CROSS-REFERENCE TO RELATED APPLICATIONS

This application is a continuation of U.S. application Ser. No. 15/472,887, filed on Mar. 29, 2017, issued as U.S. Pat. No. 10,390,260 on Aug. 20, 2019, which is a continuation of International Application No. PCT/CN2014/088067, filed on Sep. 30, 2014, the disclosure of which are hereby incorporated by reference in its entirety.

TECHNICAL FIELD

The present disclosure relates to the field of communications technologies, and in particular, to a frame transmission method for a wireless local area network and a wireless local area network apparatus.

BACKGROUND

The 802.11 protocol suite specified by the Institute of Electrical and Electronics Engineers (Institute of Electrical and Electronics Engineers, IEEE) is a standard for a wireless local area network (Wireless local Access Network, WLAN), and existing WLAN standards based on the orthogonal frequency division multiplexing (Orthogonal Frequency Division Multiplexing, OFDM) technology include evolving standards such as 802.11a, 802.11n, and 802.11ac, and are still continuously evolving. With the development and gradual popularization of the WLAN, a case in which WLAN apparatuses supporting different standards coexist will exist in a long term. To implement backward compatibility, an access point (Access Point, AP) and a station (Station, STA) with a new-generation standard need to support earlier standards.

Frame formats used by multiple existing WLAN standards and future WLAN standards are different. Therefore, a WLAN apparatus employing a new-generation standard needs to have a capability of recognizing a frame of a particular WLAN standard, and the frame of the particular WLAN standard does not affect receiving of a frame of another standard.

SUMMARY

Embodiments of the present invention provide a frame transmission method for a wireless local area network and a wireless local area network apparatus, to recognize frames of different WLAN standards.

According to a first aspect, the present invention provides a frame transmission method for a wireless local area network, where the method includes:

generating a frame, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period; and sending the frame to a wireless local area network WLAN apparatus.

In a first implementation manner of the first aspect, the long guard period is two times the length of the cyclic prefix of the legacy signal field, and the length of the first symbol cyclic suffix is the same as the length of the cyclic prefix of the legacy signal field.

In a second implementation manner of the first aspect, the long guard period is three times the length of the cyclic prefix of the legacy signal field, and the length of the first symbol cyclic suffix is two times the length of the cyclic prefix of the legacy signal field.

With reference to the first aspect, or the first or the second possible implementation manner of the first aspect, in a third possible implementation manner, the first symbol cyclic prefix is the same as an ending part, having a length the same as the length of the cyclic prefix of the legacy signal field, in the first symbol.

With reference to any one of the first aspect, or the first to the third possible implementation manners of the first aspect, in a fourth possible implementation manner, the first symbol cyclic suffix is the same as a starting part, having a length the same as the difference obtained by subtracting the length of the cyclic prefix of the legacy signal field from the long guard period, in the first symbol.

With reference to any one of the first aspect, or the first to the fourth possible implementation manners of the first aspect, in a fifth possible implementation manner, the second symbol cyclic prefix is the same as an ending part, having a length the same as the long guard period, in the second symbol.

With reference to any one of the first aspect, or the first to the fifth possible implementation manners of the first aspect, in a sixth possible implementation manner, the frame further includes a repeated legacy signal field, the repeated legacy signal field is located before the user common signal field, and the legacy signal field includes a legacy signal symbol and a cyclic prefix of the legacy signal symbol.

With reference to any one of the first aspect, or the first to the fifth possible implementation manners of the first aspect, in a seventh possible implementation manner, the frame further includes a legacy long training field and a repeated legacy long training field, the repeated legacy long training field is located before the user common signal field, and the repeated legacy long training field includes the second symbol of the legacy long training field and a cyclic prefix of the second symbol of the legacy long training field.

With reference to any one of the first aspect, or the first to the fifth possible implementation manners of the first aspect, in an eighth possible implementation manner, the frame further includes a repeated first symbol and a repeated first symbol cyclic prefix, and the repeated first symbol and the repeated first symbol cyclic prefix are located before the user common signal field.

According to a second aspect, the present invention provides a frame transmission method for a wireless local area network, where the method includes:

receiving a frame sent by a wireless local area network WLAN apparatus, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period;

removing, from a first received symbol, a prefix having a length two times the length of the cyclic prefix of the legacy signal field, and performing quarter-cycle cyclic shifting on a remaining part to obtain a first payload received symbol, where the first received symbol includes the first symbol cyclic prefix, the first symbol, and the first symbol cyclic suffix, and the cycle is a length of the first symbol;

removing, from N second received symbols separately, a prefix having a length two times the length of the cyclic prefix of the legacy signal field, to obtain N second payload received symbols, where the second received symbol includes the second symbol and the corresponding second symbol cyclic prefix; and demodulating the first payload received symbol and the N second payload received symbols to obtain data information.

In a first implementation manner of the second aspect, the method further includes:

determining the frame as a frame of a standard if it is detected that a repeated legacy signal field exists in the frame.

In a second implementation manner of the second aspect, the method further includes:

determining the frame as a frame of a standard if it is detected that the second symbol of a repeated legacy long training field exists in the frame.

With reference to the second possible implementation manner of the second aspect, in a third possible implementation manner, the method further includes:

obtaining channel information according to a legacy long training field and the second symbol of the repeated legacy long training field, where the legacy long training field includes two legacy long training symbols and two legacy long training symbol cyclic prefixes.

In a fourth implementation manner of the second aspect, the method further includes:

determining the frame as a frame of a standard if a repeated first symbol is detected.

With reference to the fourth possible implementation manner of the second aspect, in a fifth possible implementation manner, the method further includes:

obtaining data information according to the first symbol included in the user common signal field and the repeated first symbol.

According to a third aspect, the present invention provides a wireless local area network apparatus, where the apparatus includes:

a processor, configured to generate a frame, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period; and a transmitter, configured to send the frame to a wireless local area network WLAN apparatus.

In a first implementation manner of the third aspect, the long guard period is two times the length of the cyclic prefix of the legacy signal field, and the length of the first symbol cyclic suffix is the same as the length of the cyclic prefix of the legacy signal field.

In a second implementation manner of the third aspect, the long guard period is three times the length of the cyclic prefix of the legacy signal field, and the length of the first symbol cyclic suffix is two times the length of the cyclic prefix of the legacy signal field.

With reference to the third aspect, or the first or the second possible implementation manner of the third aspect, in a third possible implementation manner, the first symbol cyclic prefix is the same as an ending part, having a length the same as the length of the cyclic prefix of the legacy signal field, in the first symbol.

With reference to any one of the third aspect, or the first to the third possible implementation manners of the third aspect, in a fourth possible implementation manner, the first symbol cyclic suffix is the same as a starting part, having a length the same as the difference obtained by subtracting the length of the cyclic prefix of the legacy signal field from the long guard period, in the first symbol.

With reference to any one of the third aspect, or the first to the fourth possible implementation manners of the third aspect, in a fifth possible implementation manner, the second symbol cyclic prefix is the same as an ending part, having a length the same as the long guard period, in the second symbol.

With reference to any one of the third aspect, or the first to the fifth possible implementation manners of the third aspect, in a sixth possible implementation manner, the frame further includes a repeated legacy signal field, the repeated legacy signal field is located before the user common signal field, and the legacy signal field includes a legacy signal symbol and a cyclic prefix of the legacy signal symbol.

With reference to any one of the third aspect, or the first to the fifth possible implementation manners of the third aspect, in a seventh possible implementation manner, the frame further includes a legacy long training field and a repeated legacy long training field, the repeated legacy long training field is located before the user common signal field, and the repeated legacy long training field includes the second symbol of the legacy long training field and a cyclic prefix of the second symbol of the legacy long training field.

With reference to any one of the third aspect, or the first to the fifth possible implementation manners of the third aspect, in an eighth possible implementation manner, the frame further includes a repeated first symbol and a repeated first symbol cyclic prefix, and the repeated first symbol and the repeated first symbol cyclic prefix are located before the user common signal field.

According to a fourth aspect, the present invention provides a wireless local area network apparatus, where the apparatus includes:

a receiver, configured to receive a frame sent by a wireless local area network WLAN apparatus, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period; and a processor, configured to: remove, from a first received symbol, a prefix having a length two times the length of the cyclic prefix of the legacy signal field, and perform quarter-cycle cyclic shifting on a remaining part to obtain a first payload received symbol, where the first received symbol includes the first symbol cyclic prefix, the first symbol, and the first symbol cyclic suffix, and the cycle is a length of the first symbol;

remove, from N second received symbols separately, a prefix having a length two times the length of the cyclic prefix of the legacy signal field, to obtain N second payload received symbols, where the second received symbol includes the second symbol and the corresponding second symbol cyclic prefix; and demodulate the first payload received symbol and the N second payload received symbols to obtain data information.

In a first implementation manner of the fourth aspect, the processor is further configured to:

determine the frame as a frame of a standard if it is detected that a repeated legacy signal field exists in the frame.

In a second implementation manner of the fourth aspect, the processor is further configured to:

determine the frame as a frame of a standard if it is detected that the second symbol of a repeated legacy long training field exists in the frame.

With reference to the second possible implementation manner of the fourth aspect, in a third possible implementation manner, the processor is further configured to:

obtain channel information according to a legacy long training field and the second symbol of the repeated legacy long training field, where the legacy long training field includes two legacy long training symbols and two legacy long training symbol cyclic prefixes.

In a fourth implementation manner of the fourth aspect, the processor is further configured to:

determine the frame as a frame of a standard if a repeated first symbol is detected.

With reference to the fourth possible implementation manner of the fourth aspect, in a fifth possible implementation manner, the processor is further configured to:

obtain data information according to the first symbol included in the user common signal field and the repeated first symbol.

According to the embodiments, in a frame transmission process in a WLAN, a user common signal field of a received frame is detected and a frame of a particular standard is recognized, so that backward compatibility of a WLAN apparatus is implemented, and hybrid networking of WLAN apparatuses of different standards can be supported, thereby improving flexibility of network deployment, and reducing complexity of networking.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 1 is a schematic diagram of 802.11a, 802.11n, and 802.11ac frame structures;

FIG. 2 is a schematic diagram of a 802.11ax frame structure;

FIG. 3 is a schematic diagram of a WLAN deployment scenario;

FIG. 4 is a flowchart of a frame transmission method for a wireless local area network according to an embodiment of the present invention;

FIG. 5A is a schematic diagram of a 802.11ax frame structure according to an embodiment of the present invention;

FIG. 6 is a schematic diagram of another 802.11ax frame structure according to an embodiment of the present invention;

FIG. 7 is a schematic diagram of another 802.11ax frame structure according to an embodiment of the present invention;

FIG. 9 is a flowchart of another frame transmission method for a wireless local area network according to an embodiment of the present invention;

FIG. 10 is a schematic diagram of another 802.11ax frame structure according to an embodiment of the present invention;

DESCRIPTION OF EMBODIMENTS

Figure 5B:
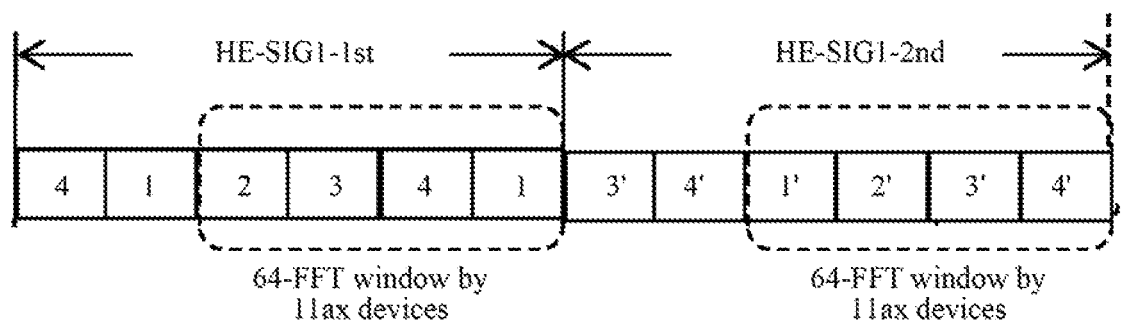
FIG. 5B is a schematic diagram of a 802.11ax frame structure according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In existing WLAN standards, a relatively great difference exists among frame structures of the standards, where 802.11a, 802.11n, and 802.11ac frame structures are shown in FIG. 1. FIG. 1 is merely used to exemplarily describe the frame structures, and does not represent an actual field length or the like. The frame structures of these three standards all have a same legacy preamble field (Legacy Preamble), where the legacy preamble specifically includes a legacy short training field (Legacy Short Training field, L-STF), a legacy long training field (Legacy Long Training field, L-LTF), and a legacy signal field (Legacy Signal field, L-SIG).

After the Legacy Preamble field, a 802.11a frame includes a data field (Data); a 802.11n frame includes a high throughput signal field (High Throughput Signal field, HT-SIG), a high throughput short training field (High Throughput Short Training field, HT-STF), a high throughput long training field (High Throughput Long Training field, HT-LTF), and a data field (Data), where the HT-SIG field includes two symbols modulated in a quadrature binary phase shift keying (Quadrature Binary Phase Shift Keying, QBPSK) modulation manner; and a 802.11ac frame includes a very high throughput signal-A field (Very High Throughput Signal-A field, VHT-SIG-A), a very high throughput short training field (Very High Throughput Short Training field, VHT-STF), a very high throughput long training field (Very High Throughput Long Training field, VHT-LTF), a very high throughput signal-B field (Very High Throughput Signal-B field, VHT-SIG-B), and a data field (Data), where the VHT-SIG-A field includes two symbols, where the first symbol is modulated in a binary phase shift keying (Binary Phase Shift Keying, BPSK) modulation manner, and the second symbol is modulated in a QBPSK modulation manner.

In a subsequent evolution process of WLANs, optionally, a future possible WLAN standard, for example, 802.11ax or another possible WLAN standard, is provided. Further optionally, using 802.11ax as an example, a possible 802.11ax frame structure is shown in FIG. 2. For backward compatibility with a WLAN apparatus employing an existing standard, a starting part of a 802.11ax frame is also a Legacy Preamble field, that is, includes an L-STF field, an L-LTF field, and an L-SIG field. Following the L-SIG field, there is a high efficiency wireless local area network signal-A field (High Efficiency Signal-1 field, HE-SIG1), used to transmit a user common signal. Following the HE-SIG1, there is an other high efficiency preamble field (Other HE Preamble), where the Other HE Preamble refers to one field or a combination of multiple fields, and is not limited to a specific field. Following the Other HE Preamble field, there is a data field (Data). It should be specially noted that, in a future possible WLAN standard, a standard name or a field name or the like of the WLAN standard may be replaced by any other name, which should not be considered as limitation to the protection scope of the present invention.

In a next-generation WLAN system, for an HE-SIG1 field, even if a robustest binary phase shift keying (Binary Phase Shift Keying, BPSK) modulation manner and a lowest ½ bit rate are used, when a CP length in the existing 802.11a/n/ac standards is used, in some scenarios, a relatively long delay spread (Delay Spread) is produced. Consequently, inter-symbol interference (Inter-symbol Interference, ISI) cannot meet a requirement of a signal field for a packet error ratio (Packet Error Ratio, PER).

FIG. 3 shows atypical WLAN deployment scenario, which includes an access point (Access Point, AP) and at least one station (Station, STA). Exemplarily, in the scenario shown in FIG. 3, the AP separately communicates with a STA1 and a STA2. Optionally, the AP may be an apparatus supporting the 802.11ax standard, and can be backward compatible with multiple WLAN standards such as 802.11ac, 802.11n, and 802.11a. The STA1 and the STA2 are WLAN apparatuses that can support only an earlier standard, where the STA1 supports the 802.11n and 802.11a standards, and the STA2 supports only the 802.11a standard. In this case, the AP and the STA1 may communicate with each other by using the 802.11n standard or the 802.11a standard, and the AP and the STA2 may communicate with each other by using the 802.11a standard. In this case, when receiving a frame sent by a STA, the AP needs to identify a standard of the received frame, so as to perform further subsequent processing.

Embodiment 1 of the present invention provides a frame transmission method for a wireless local area network. A process of the method in this embodiment is shown in FIG. 4, and specific steps are as follows:

101: Generate a frame, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period.

102: Send the frame to a wireless local area network WLAN apparatus.

In step 101, the user common signal field may be, but is not limited to, an HE-SIG1. Optionally, being similar to a VTH-SIG-A in IEEE 802.11ac, each symbol in the HE-SIG1 is generated by converting, at 20 MHz by using 64-IFFT, a frequency domain sequence into a signal whose length in a time domain is 3.2 µs. A length of a prefix CP in a first symbol (HE-SIG1-1st) of the HE-SIG1 maintains to be the same as that of a GI of an L-SIG. Exemplarily, GI=0.8 µs. Optionally, the long guard period may be set according to a system parameter, for example, set to two times or three times the length of the GI of the L-SIG. Correspondingly, when the long guard period is two times the length of the GI of the L-SIG, a suffix CP having a length same as that of the GI of the L-SIG is added after the first symbol of the HE-SIG1. In a subsequent symbol of the HE-SIG1, a prefix CP is added before a 3.2 µs symbol, where a length of the prefix CP is two times that of the GI of the L-SIG, that is, the length is a length of the long guard period, as shown in FIG. 5A.

At a STA or AP node, when a transmit end generates each symbol of the HE-SIG1, a frequency domain sequence is converted into a time domain signal at 20 MHz by using 64-IFFT. For ease of discussion, this embodiment is described by using an example in which the HE-SIG1 field includes two symbols. At the transmit end, the symbols of the HE-SIG1 are both modulated by using BPSK, and each symbol is converted into a time domain sequence {x(n), n=1 ... N, N=64} for sending, where each sequence occupies 3.2 µs in the time domain, and may be divided into sections 1, 2, 3, and 4. For the first symbol, the fourth section is repeatedly placed in a prefix CP, and the first section is repeatedly placed in a suffix CP; for the second symbol, the third section and the fourth section are repeatedly placed in a prefix CP, as shown in FIG. 5B.

Optionally, the method provided in this embodiment may further include:

101-1: The generated frame further includes a repeated legacy signal field, the repeated legacy signal field is located before the user common signal field, and the legacy signal field includes a legacy signal symbol and a cyclic prefix of the legacy signal symbol.

Specifically, a repeated L-SIG field may be further included before the HE-SIG1 field, where the repeated L-SIG field includes a 3.2 μs time sequence of an L-SIG and a 0.8 μs prefix CP, as shown in FIG. 6.

Optionally, the method provided in this embodiment may further include:

101-2: The generated frame further includes a legacy long training field and a repeated legacy long training field, the repeated legacy long training field is located before the user common signal field, and the repeated legacy long training field includes the second symbol of the legacy long training field and a cyclic prefix of the second symbol of the legacy long training field.

Specifically, a repeated L-LTF field may be further included before the HE-SIG1 field, where the repeated L-LTF field includes a 3.2 μs time sequence of the second symbol of an L-LTF field and a 0.8 μs prefix CP, as shown in FIG. 7.

Optionally, the method provided in this embodiment may further include:

101-3: The generated frame further includes a repeated first symbol and a repeated first symbol cyclic prefix, and the repeated first symbol and the repeated first symbol cyclic prefix are located before the user common signal field.

Figure 8:
FIG. 8 is a schematic diagram of another 802.11ax frame structure according to an embodiment of the present invention.

Specifically, a repeated HE-SIG1 field may be further included before the HE-SIG1 field, where the repeated HE-SIG1 field includes a 3.2 us time sequence of a first symbol of an HE-SIG1 field and a 0.8 μs prefix CP, as shown in FIG. 8.

The foregoing steps 101-1, 101-2, and 101-3 are interchangeable steps, and may be flexibly set in a specific implementation process according to a need of system designing.

Corresponding to the method provided in Embodiment 1 of the present invention, Embodiment 2 of the present invention provides a frame transmission method for a wireless local area network, which is used by a receive node to receive a frame. As shown in FIG. 9, specific steps are as follows:

201: Receive a frame sent by a wireless local area network WLAN apparatus, where the frame includes a user common signal field and a legacy signal field, the user common signal field includes a first symbol and N second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is the same as the length of the cyclic prefix of the legacy signal field, and a length of the second symbol cyclic prefix is two times the length of the cyclic prefix of the legacy signal field.

202: Remove, from a first received symbol, a prefix having a length two times the length of the cyclic prefix of the legacy signal field, and perform quarter-cycle cyclic shifting on a remaining part to obtain a first payload received symbol, where the first received symbol includes the first symbol cyclic prefix, the first symbol, and the first symbol cyclic suffix, and the cycle is a length of the first symbol.

203: Remove, from N second received symbols separately, a prefix having a length two times the length of the cyclic prefix of the legacy signal field, to obtain N second payload received symbols, where the second received symbol includes the second symbol and the corresponding second symbol cyclic prefix.

204: Demodulate the first payload received symbol and the N second payload received symbols to obtain data information.

Optionally, for a further specific description, setting of parameters in this embodiment is the same as that in Embodiment 1. In a specific implementation process, another setting manner may be used according to a need of system designing, and this is not limited in this embodiment.

In step 202, a 802.11ax apparatus receives the frame including the user common signal field, and when detecting the first symbol (HE-SIG1-1st) of the HE-SIG1, that is, the first received symbol, the 802.11ax apparatus removes a CP (1.6 μs) having a length two times the original length, obtains a 2, 3, 4, 1 sequence, then performs T/4 cyclic shifting to recover an order the same as that of the sent 1, 2, 3, 4 sequence, and thereby obtains the first payload received symbol, where the cycle is a length of the first symbol, that is, T=3.2 μs.

In step 203, for the second symbol (HE-SIG1-2nd) of the HE-SIG1, that is, the second received symbol, the 802.11ax apparatus removes a CP (1.6 μs) having a length two times the original length, obtains a 1', 2', 3', 4' sequence whose order is the same as that of the sequence of the transmit end, and thereby obtains the second payload received symbol.

In step 204, the first payload received symbol and the second payload received symbol are demodulated. It should be noted that, a demodulation order is not limited in this embodiment. Optionally, the 802.11ax apparatus may perform demodulation after obtaining the first payload received symbol, and perform demodulation after obtaining the second payload received symbol. Alternatively, optionally, the 802.11ax apparatus may perform demodulation after obtaining both the first payload received symbol and the second payload received symbol.

When users of the legacy 802.11a/n/ac detect the first symbol (HE-SIG1-1st) of the HE-SIG1 in the time domain, as shown in FIG. 10, a CP (0.8 μs) having a length the same as the original length is removed, and a 1, 2, 3, 4 sequence is obtained, and has an order the same as that of the sent sequence, and after transformation to the frequency domain is performed, a modulation manner is still BPSK modulation, and the user of 802.11n is not affected. When the second symbol (HE-SIG1-2st) of the HE-SIG1 is detected, a suffix CP (0.8 μs) having a length the same as the original length is removed, and a 3', 4', 1', 2' sequence is obtained, which is equivalent to performing T/2 cyclic shifting on the sequence of the transmit end, and a modulation manner in the frequency domain is still BPSK modulation, and the user of 802.11ac is not affected. The user of 802.11a does not perform self-detection, and is not affected.

Optionally, if the received frame includes the repeated legacy signal field in step 101-1, after step 201, the method provided in this embodiment may further include:

201-1: Determine the frame as a frame of a standard if it is detected that a repeated legacy signal field exists in the frame.

In this embodiment, a standard is the 802.11ax standard, and in a subsequent evolution process of WLANs, the standard may be another standard, and this is not limited in this embodiment.

The 802.11ax apparatus may detect, by using a repeated L-SIG field, a frame of the 802.11ax standard. Specifically, autocorrelation detection may be performed by using a sampling point (for example, N=64) of a symbol in the time domain, or a sum of energy of a real part and an imaginary part of the N=64 sampling point is compared in the time domain. If a peak appears in a detection result, it is determined that a repeated symbol exists in the received frame. Further optionally, a threshold may be used to determine whether a repeated L-SIG symbol exists. When a detection result indicates that a repeated L-SIG symbol exists, it is determined that the received frame is a 802.11ax frame, and then subsequent processing is performed, where the subsequent processing includes, but is not limited to, step 202 to step 204.

Further, the 802.11ax apparatus may perform combined receiving according to the legacy signal field and the repeated legacy signal field, and obtain a corresponding diversity gain.

Figure 11:
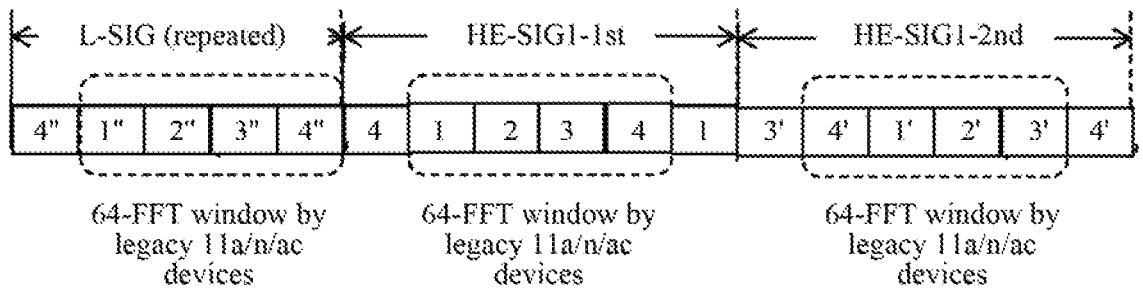
FIG. 11 is a schematic diagram of another 802.11ax frame structure according to an embodiment of the present invention.

For 802.11a/n/ac apparatuses, when a 802.11ax frame is detected, as shown in FIG. 11, a repeated L-SIG symbol is detected in the time domain, and is a BPSK symbol in the frequency domain, and the user of 802.11n is not affected. When the first symbol (HE-SIG1-1st) of the HE-SIG1 is detected, a CP having a length the same as the original length is removed, and a 1, 2, 3, 4 sequence is obtained, and has an order the same as that of the sent sequence, and after transformation to the frequency domain is performed, a modulation manner is still BPSK modulation, and the modulation manner is still BPSK modulation in the frequency domain, and the user of 802.11ac is not affected. The user of 802.11a does not perform self-detection, and is not affected.

Optionally, if the received frame includes the repeated legacy long training field in step 101-2, after step 201, the method provided in this embodiment may further include:

201-2: Determine the frame as a frame of a standard if it is detected that the second symbol of a repeated legacy long training field exists in the frame.

The 802.11ax apparatus may detect, by using a repeated L-LTF field, a frame of the 802.11ax standard. For a specific processing manner, refer to the description in step 201-1, and details are not described herein again.

Further, the 802.11ax apparatus may obtain channel information according to the legacy long training field and the second symbol of the repeated legacy long training field, and obtain a corresponding diversity gain.

Figure 12:
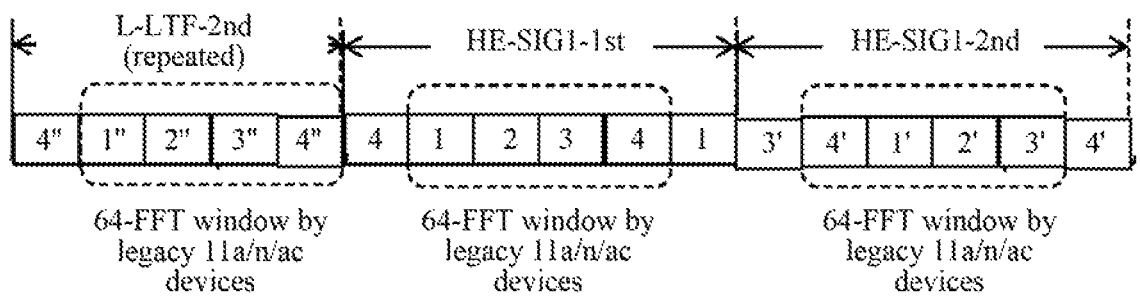
FIG. 12 is a schematic diagram of another 802.11ax frame structure according to an embodiment of the present invention.

For the 802.11a/n/ac apparatuses, for a processing manner of detecting a 802.11ax frame, refer to the description in step 201-1, and refer to FIG. 12, and details are not described herein again.

Optionally, if the received frame includes the repeated first symbol and the repeated first symbol cyclic prefix in step 101-3, after step 201, the method provided in this embodiment may further include:

201-3: Determine the frame as a frame of a standard if a repeated first symbol is detected.

The 802.11ax apparatus may detect, by using a repeated first symbol of an HE-SIG1 field, a frame of the 802.11ax standard. For a specific processing manner, refer to the description in step 201-1, and details are not described herein again.

Figure 13:
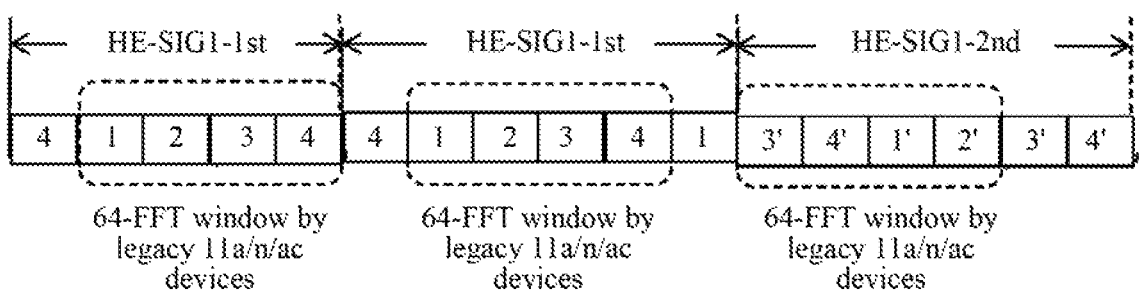
FIG. 13 is a schematic diagram of another 802.11ax frame structure according to an embodiment of the present invention.

For the 802.11a/n/ac apparatuses, for a processing manner of detecting a 802.11ax frame, refer to the description in step 201-1, and refer to FIG. 13, and details are not described herein again.

Further, the 802.11ax apparatus may obtain data information according to the first symbol included in the user common signal field and the repeated first symbol, and obtain a corresponding diversity gain.

Figure 14:
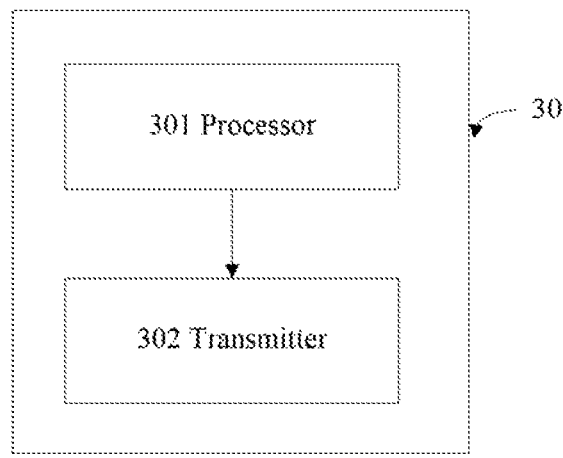
FIG. 14 shows a wireless local area network apparatus according to an embodiment of the present invention.

Embodiment 3 of the present invention provides a wireless local area network apparatus 30. As shown in FIG. 14, the apparatus specifically includes:

a processor 301, configured to generate a frame, where the frame includes a user common signal field and a legacy signal field, the user common signal field includes a first symbol and N subsequent second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is a difference obtained by subtracting the length of the cyclic prefix of the legacy signal field from a long guard period, and a length of the second symbol cyclic prefix is the long guard period; and a transmitter 302, configured to send the frame to a wireless local area network WLAN apparatus.

Optionally, the frame generated by the processor 301 further includes a repeated legacy signal field, the repeated legacy signal field is located before the user common signal field, and the legacy signal field includes a legacy signal symbol and a cyclic prefix of the legacy signal symbol.

Optionally, the frame generated by the processor 301 further includes a legacy long training field and a repeated legacy long training field, the repeated legacy long training field is located before the user common signal field, and the repeated legacy long training field includes the second symbol of the legacy long training field and a cyclic prefix of the second symbol of the legacy long training field.

Optionally, the frame generated by the processor 301 further includes a repeated first symbol and a repeated first symbol cyclic prefix, and the repeated first symbol and the repeated first symbol cyclic prefix are located before the user common signal field.

The wireless local area network apparatus provided in Embodiment 3 may be used to execute the frame transmission method for a wireless local area network provided in Embodiment 1. For specific steps, refer to descriptions in Embodiment 1, and details are not described herein again.

Figure 15:
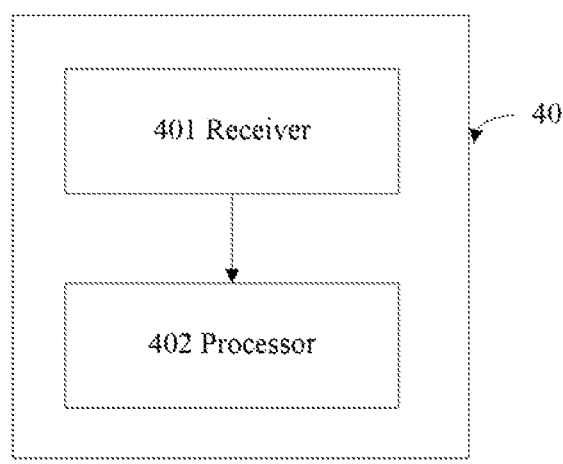
FIG. 15 shows another wireless local area network apparatus according to an embodiment of the present invention.

Embodiment 4 of the present invention provides a wireless local area network apparatus 40. As shown in FIG. 15, the apparatus specifically includes:

a receiver 401, configured to receive a frame sent by a wireless local area network WLAN apparatus, where the frame includes a user common signal field and a legacy signal field, the user common signal field includes a first symbol and N second symbols, N is a positive integer, a first symbol cyclic prefix is further included before the first symbol, a first symbol cyclic suffix is further included after the first symbol, and a second symbol cyclic prefix is further included before each second symbol of the N second symbols, where a length of the first symbol cyclic prefix is the same as a length of a cyclic prefix of the legacy signal field, a length of the first symbol cyclic suffix is the same as the length of the cyclic prefix of the legacy signal field, and a length of the second symbol cyclic prefix is two times the length of the cyclic prefix of the legacy signal field; and a processor 402, configured to: remove, from a first received symbol, a prefix having a length two times the length of the cyclic prefix of the legacy signal field, and perform quarter-cycle cyclic shifting on a remaining part to obtain a first payload received symbol, where the first received symbol includes the first symbol cyclic prefix, the first symbol, and the first symbol cyclic suffix, and the cycle is a length of the first symbol;

remove, from N second received symbols separately, a prefix having a length two times the length of the cyclic prefix of the legacy signal field, to obtain N second payload received symbols, where the second received symbol includes the second symbol and the corresponding second symbol cyclic prefix; and demodulate the first payload received symbol and the N second payload received symbols to obtain data information.

Specifically, the processor 401 is further configured to:

optionally, determine the frame as a frame of a standard if it is detected that a repeated legacy signal field exists in the frame;

optionally, determine the frame as a frame of a standard if it is detected that the second symbol of a repeated legacy long training field exists in the frame; and optionally, determine the frame as a frame of a standard if a repeated first symbol is detected.

The wireless local area network apparatus provided in Embodiment 4 may be used to execute the frame transmission method for a wireless local area network provided in Embodiment 2. For specific steps, refer to descriptions in Embodiment 2, and details are not described herein again.

The wireless local area network apparatuses provided in Embodiment 3 and Embodiment 4 of the present invention may be applied to an AP or a STA, and may specifically include a fixed terminal such as a WLAN router, a WLAN switch, a computer, or a server, or may include a mobile terminal such as a mobile phone, a tablet computer, a wearable apparatus, or a laptop computer. Further, the receiver or the transmitter may be a dedicated receiving apparatus or transmitting apparatus, or may be a transceiver integrating receiving and transmitting functions. The processor may be an integrated circuit (Integrated Circuit, IC), an application-specific integrated circuit (Application Specific Integrated Circuit, ASIC), a field programmable gate array (Field-Programmable Gate Array, FPGA), or the like, or may be integrated in a baseband processor or a general processor.

Based on the foregoing descriptions of the embodiments, a person skilled in the art may clearly understand that the present invention may be implemented by software in addition to necessary general hardware. Based on the understanding, all or a part of the steps of the technical solutions of the present invention may be implemented by a program instructing relevant hardware. The program may be stored in a computer readable storage medium. When the program is run, the steps of the method according to the foregoing embodiments are performed. The storage medium may be a ROM/RAM, a magnetic disk, an optical disc, and the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A frame transmission method for a wireless local area network to recognize frames of different wireless local area network standards, the method comprising:

generating, by a processor, a frame, wherein the frame comprises a user common signal field and a legacy signal field, the user common signal field comprises a first symbol and N subsequent second symbols, wherein N is a positive integer, wherein a first symbol cyclic prefix is before the first symbol, wherein a first symbol cyclic suffix is after the first symbol, and wherein a second symbol cyclic prefix is before each second symbol of the N second symbols, wherein a length of the first symbol cyclic prefix is the same as a length of a cyclic prefix of the legacy signal field, wherein a length of the first symbol cyclic suffix is a difference obtained by subtracting the length of the cyclic prefix of the legacy signal field from a long guard period, and a length of the second symbol cyclic prefix is the long guard period to support different wireless local area network standards so that the wireless local area networking flexibility is increased and complexity is decreased; and sending, by the processor, the frame to a wireless local area network apparatus, wherein the long guard period is two times the length of the cyclic prefix of the legacy signal field, and the length of the first symbol cyclic suffix is the same as the length of the cyclic prefix of the legacy signal field, or wherein the long guard period is three times the length of the cyclic prefix of the legacy signal field, and the length of the first symbol cyclic suffix is two times the length of the cyclic prefix of the legacy signal field.

2. The method according to claim 1, wherein the first symbol cyclic prefix is the same as an ending part, having the length the same as the length of the cyclic prefix of the legacy signal field, in the first symbol.

3. The method according to claim 1, wherein the first symbol cyclic suffix is the same as a starting part, having the length the same as the difference obtained by subtracting the length of the cyclic prefix of the legacy signal field from the long guard period, in the first symbol.

4. The method according to claim 1, wherein the second symbol cyclic prefix is the same as an ending part, having the length the same as the long guard period, in the second symbol.

5. The method according to claim 1, wherein the frame further comprises a repeated legacy signal field, wherein the repeated legacy signal field is located before the user common signal field, and the legacy signal field comprises a legacy signal symbol and a cyclic prefix of the legacy signal symbol.

6. The method according to claim 1, wherein the frame further comprises a legacy long training field and a repeated legacy long training field, wherein the repeated legacy long training field is located before the user common signal field, and wherein the repeated legacy long training field comprises the second symbol of the legacy long training field and a cyclic prefix of the second symbol of the legacy long training field.

7. The method according to claim 1, wherein the frame further comprises a repeated first symbol and a repeated first symbol cyclic prefix, and wherein the repeated first symbol and the repeated first symbol cyclic prefix are located before the user common signal field.

8. A wireless local area network apparatus to recognize frames of different wireless local area network standards, the wireless local area network apparatus comprising:

a memory; and a processor coupled to the memory, wherein the processor is configured to generate a frame, wherein the frame comprises a user common signal field and a legacy signal field, wherein the user common signal field comprises a first symbol and N subsequent second symbols, wherein N is a positive integer, wherein a first symbol cyclic prefix is before the first symbol, wherein a first symbol cyclic suffix is after the first symbol, and wherein a second symbol cyclic prefix is before each second symbol of the N second symbols, wherein a length of the first symbol cyclic prefix is the same as a length of a cyclic prefix of the legacy signal field, wherein a length of the first symbol cyclic suffix is a difference obtained by subtracting the length of the cyclic prefix of the legacy signal field from a long guard period, and a length of the second symbol cyclic prefix is the long guard period to support different wireless local area network standards so that the wireless local area networking flexibility is increased and complexity is decreased; and a transmitter in communication with the processor that is configured to send the frame to a wireless local area network apparatus;

wherein the long guard period is two times the length of the cyclic prefix of the legacy signal field, and the length of the first symbol cyclic suffix is the same as the length of the cyclic prefix of the legacy signal field, or wherein the long guard period is three times the length of the cyclic prefix of the legacy signal field, and the length of the first symbol cyclic suffix is two times the length of the cyclic prefix of the legacy signal field.

9. The apparatus according to claim 8, wherein the first symbol cyclic prefix is the same as an ending part, having the length the same as the length of the cyclic prefix of the legacy signal field, in the first symbol.

\* \* \* \* \*